US012519555B2

(12) United States Patent
Seethamraju (10) Patent No.: US 12,519,555 B2
(45) Date of Patent: *Jan. 6, 2026

(54) SYNCHRONIZING UPDATE OF TIME OF DAY COUNTERS USING TIME STAMP EXCHANGE OVER A CONTROL PLANE

(71) Applicant: Skyworks Solutions, Inc., Irvine, CA (US)

(72) Inventor: Srisai Rao Seethamraju, Nashua, NH (US)

(73) Assignee: Skyworks Solutions, Inc., Irvine, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 17/982,305

(22) Filed: Nov. 7, 2022

(65) Prior Publication Data

US 2023/0208543 A1 Jun. 29, 2023

Related U.S. Application Data

(63) Continuation of application No. 16/235,784, filed on Dec. 28, 2018, now Pat. No. 11,496,234.

(60) Provisional application No. 62/683,464, filed on Jun. 11, 2018.

(51) Int. Cl.
*H04J 3/06* (2006.01)

(52) U.S. Cl.
CPC .......... *H04J 3/0667* (2013.01); *H04J 3/0632* (2013.01); *H04J 3/0673* (2013.01); *H04J 3/0688* (2013.01); *H04J 3/0697* (2013.01)

(58) Field of Classification Search
None
See application file for complete search history.

(56) References Cited

U.S. PATENT DOCUMENTS

| 1,007,639 | A | 10/1911 | Browne |
| 5,140,611 | A | 8/1992 | Jones |
| 5,509,038 | A | 4/1996 | Wicki |
| 5,644,604 | A | 7/1997 | Larson |
| 5,964,880 | A | 10/1999 | Liu |

(Continued)

FOREIGN PATENT DOCUMENTS

| CN | 101146109 | 3/2008 |
| CN | 102291233 | 12/2011 |

(Continued)

OTHER PUBLICATIONS

Machine translation of WO 2011045300 A2 (Year: 2011).*

(Continued)

*Primary Examiner* — Kenny S Lin
*Assistant Examiner* — Rodrick Mak
(74) *Attorney, Agent, or Firm* — Knobbe, Martens, Olson & Bear, LLP (57) ABSTRACT

A control plane, available to all of the line cards in a system, is used to exchange time stamps to align the Time of Day counters in the master line cards. The master line cards are locked to a system clock distributed over the backplane by a timing card. The timing card is locked to timing of a slave line card that is synchronized with the grand master. Each master line card synchronizes updating its Time of Day counter based on a time stamp exchange and a local clock locked to the system clock and without the use of a 1 pulse per second signal.

20 Claims, 9 Drawing Sheets

(56) References Cited

U.S. PATENT DOCUMENTS

| | | |
|---|---|---|
| 6,760,586 B1 | 7/2004 | Lee |
| 7,002,996 B1 | 2/2006 | Dougherty et al. |
| 7,079,589 B1 | 7/2006 | Maksimovic |
| 7,116,743 B1 | 10/2006 | Wang |
| 7,203,227 B1 | 4/2007 | Currivan |
| 7,451,337 B1 | 11/2008 | Hewitt |
| 7,451,339 B2 | 11/2008 | Smith, Sr. |
| 7,535,893 B1 | 5/2009 | Beladakere et al. |
| 7,860,205 B1 | 12/2010 | Aweya et al. |
| 7,903,681 B2 | 3/2011 | Roberts et al. |
| 8,942,561 B2 | 1/2015 | Boyd et al. |
| 9,246,615 B2 | 1/2016 | Ellegard et al. |
| 9,426,762 B2 | 8/2016 | Ehlers et al. |
| 9,479,182 B1 | 10/2016 | Baidas |
| 9,628,255 B1 | 4/2017 | Baidas |
| 9,860,004 B2 | 1/2018 | Joergensen |
| 9,960,873 B2 | 5/2018 | Yang et al. |
| 10,075,284 B1 | 9/2018 | Rodrigues |
| 10,158,444 B1 | 12/2018 | Darras |
| 10,594,423 B1 | 3/2020 | Anand et al. |
| 10,715,307 B1 | 7/2020 | Jin |
| 10,797,686 B1 | 10/2020 | Terstrup et al. |
| 10,917,097 B1 | 2/2021 | Meyer et al. |
| 10,951,216 B1 | 3/2021 | Barnette |
| 11,061,432 B2 | 7/2021 | Sarda |
| 11,088,816 B1 | 8/2021 | Sarda |
| 11,088,819 B1 | 8/2021 | Sarda |
| 11,496,234 B2 | 11/2022 | Seethamraju |
| 2006/0020733 A1 | 1/2006 | Sarda |
| 2006/0280182 A1 | 12/2006 | Williams |
| 2007/0046516 A1 | 3/2007 | Dombusch |
| 2009/0024865 A1 | 1/2009 | Fugaro |
| 2009/0168808 A1* | 7/2009 | Cho ................... H04J 3/0697 342/357.44 |
| 2010/0118894 A1 | 5/2010 | Aweya et al. |
| 2012/0300795 A1 | 11/2012 | Joergensen |
| 2015/0185759 A1 | 7/2015 | Hinderer et al. |
| 2016/0170439 A1 | 6/2016 | Aweya |
| 2016/0182217 A1 | 6/2016 | Hashizume |
| 2017/0288801 A1 | 10/2017 | Aweya |
| 2017/0373824 A1 | 12/2017 | Mitchler |
| 2019/0036804 A1 | 1/2019 | Mihelic et al. |
| 2019/0379474 A1 | 12/2019 | Coulter |
| 2020/0021379 A1 | 1/2020 | Aweya |
| 2020/0050575 A1 | 2/2020 | Mishra |
| 2020/0285265 A1 | 9/2020 | Ranganathan |
| 2021/0297083 A1 | 9/2021 | Nishikawa |

FOREIGN PATENT DOCUMENTS

| | | | |
|---|---|---|---|
| CN | 103684727 | 3/2014 | |
| CN | 104378193 | 2/2015 | |
| CN | 105706383 | 6/2016 | |
| CN | 107294634 | 10/2017 | |
| WO | WO-2011045300 A2 * | 4/2011 | ............ H04J 3/0697 |

OTHER PUBLICATIONS

82P33831, Synchronization Management Unit for IEEE 1588 and 10G/40G/100G Synchronous Ethernet, Renesas, Jul. 10, 2018.

AN-12149, Implementing an IEEE 1588 V2 on i.MX RT Using PTPd, FreeRTOS, and lsIP TCP/IP stack, NXP Semiconductors, Sep. 2018.

Broadcom Corp., "Ethernet time synchronization providing native timing within the network", White Paper, Oct. 2008, 36 pages.

G.8273/Y.1368 (2018)—Amendment 1, Framework of phase and time clocks, ITU-T, Mar. 2020.

Renesas, "Synchronization management unit", 8A34002 Datasheet, Renesas Electronics Corporation, Sep. 8, 2020, 107 pages.

Stanton, 802.1AS Tutorial, Intel Corporation, Nov. 13, 2008, 42 pages.

* cited by examiner

SYNCHRONIZING UPDATE OF TIME OF DAY COUNTERS USING TIME STAMP EXCHANGE OVER A CONTROL PLANE

CROSS-REFERENCE TO RELATED APPLICATIONS

This application is a continuation of U.S. application Ser. No. 16/235,784, filed Dec. 28, 2018, entitled "SYNCHRONIZING UPDATE OF TIME OF DAY COUNTERS USING TIME STAMP EXCHANGE OVER A CONTROL PLANE," which claims benefit of provisional application No. 62/683,464, entitled "DISTRIBUTION OF TIME-OF-DAY (TOD) AND 1 PULSE-PER-SECOND (1 PPS) TO LINE CARDS IN IEEE 1588 CENTRAL TIMING ARCHITECTURE", naming Srisai Rao Seethamraju, Russell Croman, and Robert P. Coulter as inventors, filed Jun. 11, 2018. Each of the foregoing applications are incorporated herein by reference in their entirety.

This application relates to U.S. application Ser. No. 16/235,232, entitled "SHARED COMMUNICATION CHANNEL THAT INTERLEAVES 1 PPS SIGNALS AND MESSAGING", filed on Dec. 28, 2018, issued as U.S. Pat. No. 11,296,806, naming Robert P. Coulter as inventor, which application is incorporated herein by reference in its entirety.

BACKGROUND

Field of the Invention

This invention relates to timing synchronization using a control plane to exchange time stamps.

Description of the Related Art

At present, 1 Pulse Per Second (PPS) signals generated by various boards in a distributed system need to be synchronized so that they occur at nearly the same instant throughout the system. Since these 1 PPS signals are simultaneous, separate communications paths are required for every source of these 1 PPS signals. This has two problems: (1) multiple dedicated communications paths and (2) the lengths of these paths to and from the central timing card are not identical, adding uncompensated delay, causing misalignments. The control and coordination of these systems is performed over yet another shared communications channel, adding more uncertainty. Reducing uncertainty would improve system timing synchronization.

SUMMARY OF EMBODIMENTS OF THE INVENTION

In order to achieve accuracy for Time of Day (ToD) distribution to master line cards, existing resources are utilized to updated ToD counters.

Accordingly, in an embodiment, a method includes distributing a clock signal from a timing card to a first line card and to a second line card over a backplane. A time stamp exchange is performed between the first line card and the second line card using a control plane coupled to the first and second line cards. A second time of day counter is on the second line card is synchronized to the first time of day counter on the first line card based on the time stamp exchange and the clock signal and without the need for a 1 pulse per second signal.

In another embodiment an apparatus includes a first line card having a first time of data counter and a second line card having a second time of day counter. A timing card is configured to provide a clock signal to the first and second line cards over a backplane. A control plane couples the first and second line cards over the backplane. The first and second line cards are configured to perform a time stamp exchange and the second line card is configured to synchronize the second time of day counter to the first time of day counter based on the time stamp exchange and a local clock signal frequency locked to the clock signal distributed from the timing card.

In another embodiment a method includes a slave line card synchronizing timing with a grand master. A timing card synchronizes a system clock signal with timing of the slave line card. The timing card distributes the system clock signal through a back plane to a plurality of line cards including master line cards and the slave line card. The slave line card and one of the master line cards performs a time stamp exchange and the one of the master line cards synchronizes update of a second time of day counter in the one of the master line cards to a first time of day counter in the slave line card based on the time stamp exchange and a local clock in the one of the master line cards locked to the system clock signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
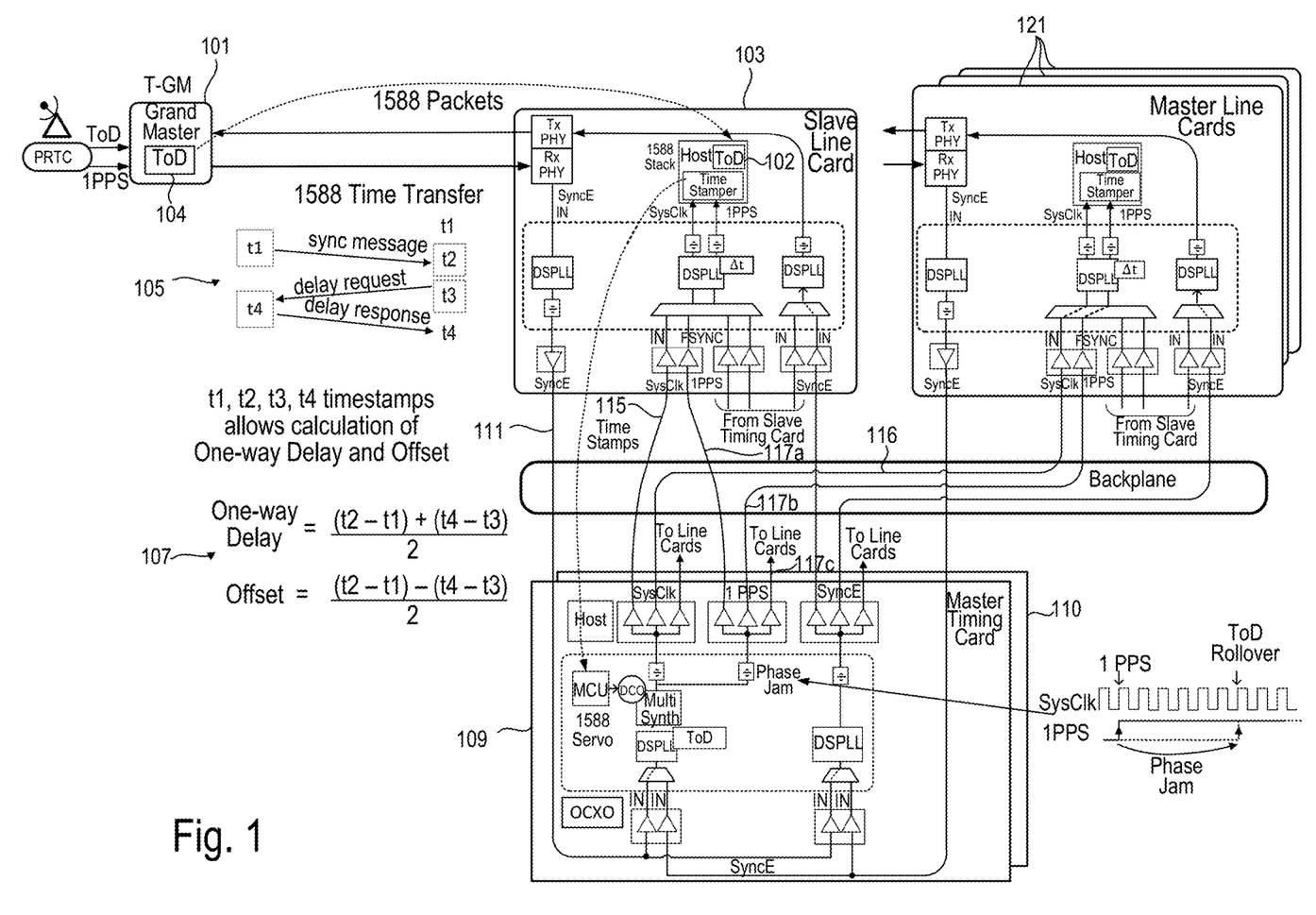
FIG. 1 shows an architecture for distributing time-of-day (ToD) from the grandmaster 101 to the slave line card 103.

FIG. 1 shows an architecture for distributing time-of-day (ToD) 102 from the grandmaster 101 to the slave line card 103. The slave line card ToD becomes synchronized with the grandmaster ToD 104 through exchange of time stamps in accordance with the IEEE 1588 protocol. The exchange is shown at 105. Each of the time stamps t1-t4 represents the departure time (t1, t3) or the receive time (t2, t4). The timestamps exchange allows determination of one-way delay (OWD) and error offset as shown at 107. The slave shares information with the master timing card 109. The system of FIG. 1 includes backup timing card 110. The slave line card 103 supplies the master timing card 109 with a SyncE signal (signal line 111) and timestamps are exchanged between the slave line card and the master timing card to synchronize the master timing card clock signal to the timing of the slave line card, which in turn has been synchronized with the grandmaster. The master timing card supplies a system clock (SysClk) 115 to the slave line card. The SysClk clocks the timestamper in the line card. A servo loop adjusts a controllable oscillator (such as a digitally controlled oscillator (DCO)) in the master timing card to synchronize the SysClk in both frequency and phase with the slave line card timing. The master timing card also supplies a 1 Pulse-Per-Second (PPS) signal 117a to the slave line card that is synchronized through a phase adjust to the time-of-day (ToD) rollover of the grand master. The various ToD counters contain the same value and turnover at the same time based on the 1PPS signal. The servo loop ensures that the slave line card and the master timing card are synchronized. The master timing card 109 also supplies the master line cards 121 with the SysClk 116 and the 1 PPS signal 118. However, absent a feedback mechanism, such as the servoloop utilized to synchronize the slave line card and the timing cards, the ToD distribution to the master line cards may lack desired precision due to, e.g., trace differences, path length differences, driver differences, voltage differences, and/or temperature differences between the timing card and the different master line cards 121. Thus, although the grandmaster receives the most accurate clock in network and the master timing card and slave line card are synchronized, other line cards (master line cards 121) are not synchronized given the open loop distribution of 1 PPS signal by the master timing card without compensation for different trace delays between the master line cards 121 and the master timing card 109 and other differences between the line cards.

Embodiments described herein describe approaches to distribute Time-of-Day (ToD) and the 1 PPS signal to master line cards in an IEEE 1588 Central Timing Architecture. These methods overcome challenges such as (a) ToD and 1 PPS signal alignment across all line-cards<1 ns (+/−500 ps) (b) backplane trace lengths should be matched or compensated c) delay uncertainty of backplane drivers/receivers should be considered in the timing budget d) I/O delay of the line card PLL should also be considered in the budget.

At present the alignment of ToD and 1PPS is a manual, cumbersome and an open-loop process. The approaches outlined in this disclosure provide more accurate closed loop measurement and adjustment techniques. Some embodiments use existing hardware and/or software infrastructure to distribute ToD and the 1 PPS signal with <1 ns alignment accuracy across all line-cards.

Figure 2:
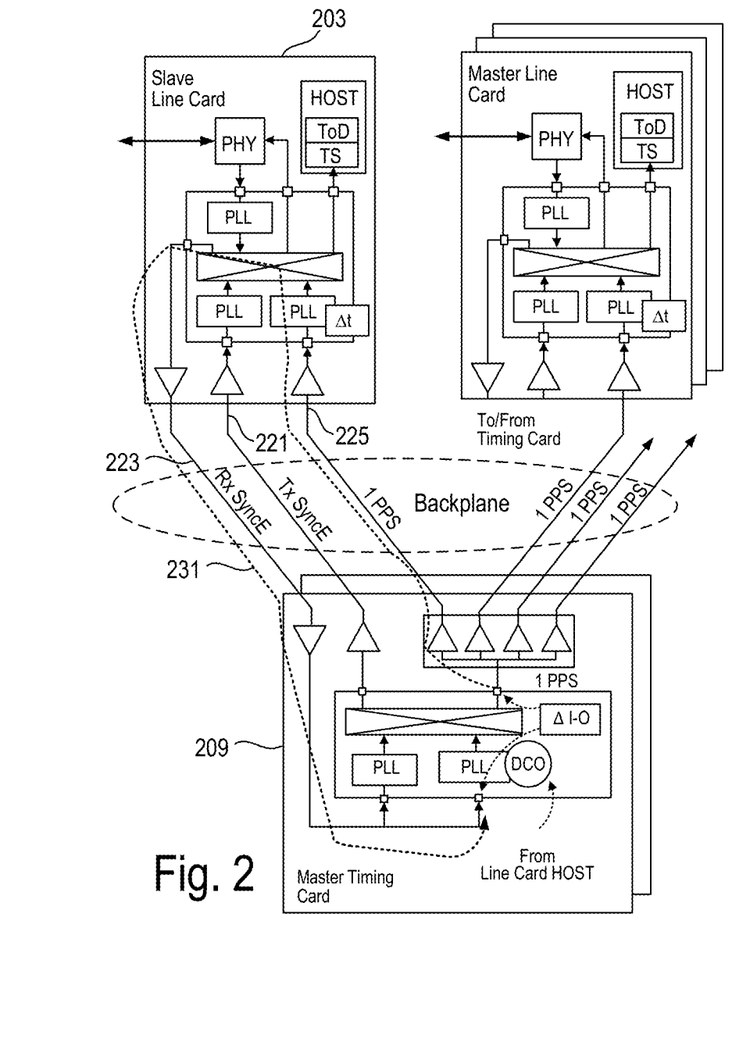
FIG. 2 illustrates an embodiment in which delays between the master timing card and the line cards are determined using existing back plane communication paths.

FIG. 2 illustrates an embodiment in which delays between the master timing card and the line cards can be determined using existing back plane communication paths between the timing card and the line cards. FIG. 2 shows the slave line card 203 and the master timing card 209. In the embodiment of FIG. 2, a synchronous packet-based communication network, such as Synchronous Ethernet (SyncE) and IEEE 1588, exists between the master timing card 209 and the slave line card 203. In FIG. 2, the connection between the timing card 209 and the slave line card 203 includes Tx SyncE 221 and Rx SyncE 223. In order to determine the trace delay, one approach measures the roundtrip time for a signal sent from the timing card 209 to the slave line card 203 and return to the timing card over path 231. Thus, in FIG. 2, the master timing card 209 sends a signal such as a pulse over the 1 PPS signal line 225 and the slave line card 203 returns the signal back over the Rx SyncE path 223. The line card can be configured to enter a test mode in order to return the received pulse and allow the trace delay to be determined. The trace delay to the slave line card 203 is assumed to be one half of the roundtrip time for the pulse issued by the timing card 209. The measured trace delays can be accounted for at the line card to provide greater accuracy in the 1 PPS signal.

Figure 3:
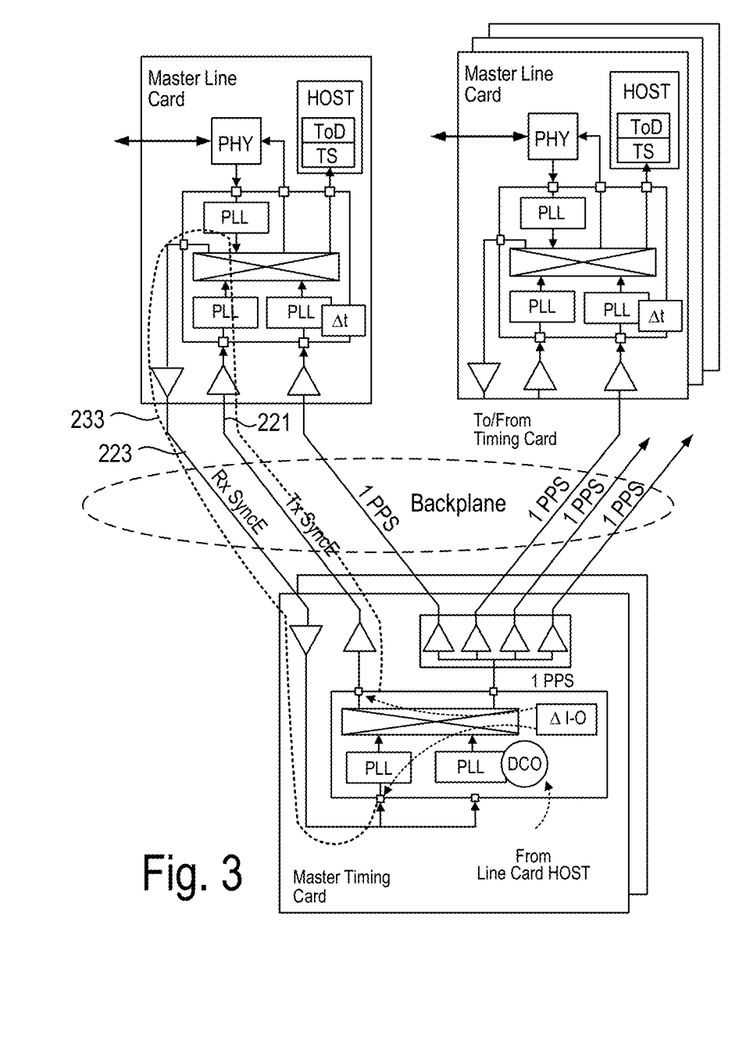
FIG. 3 illustrates an embodiment in which a Synchronous Ethernet path is used to determine trace delay between the master timing card and the slave line card.

FIG. 3 illustrates an embodiment where the timing card utilizes the SyncE transmit signal line 221 to send the test signal and uses SyncE receive signal line 223 to receive the return signal from the slave line card 203. The trace delays to the line card can be assumed to be one half of the roundtrip time over path 233 for the pulse issued by the timing card 209.

Figure 4:
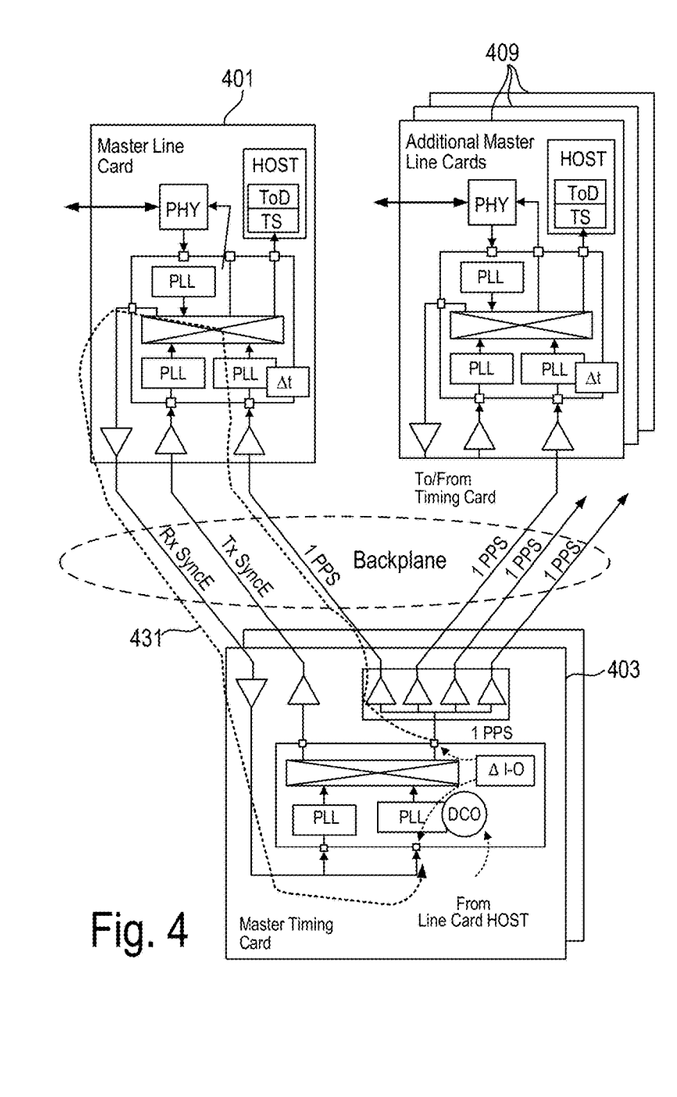
FIG. 4 illustrates an embodiment in which delays between the master timing card and the master line cards are determined using existing back plane communication paths.
Figure 5:
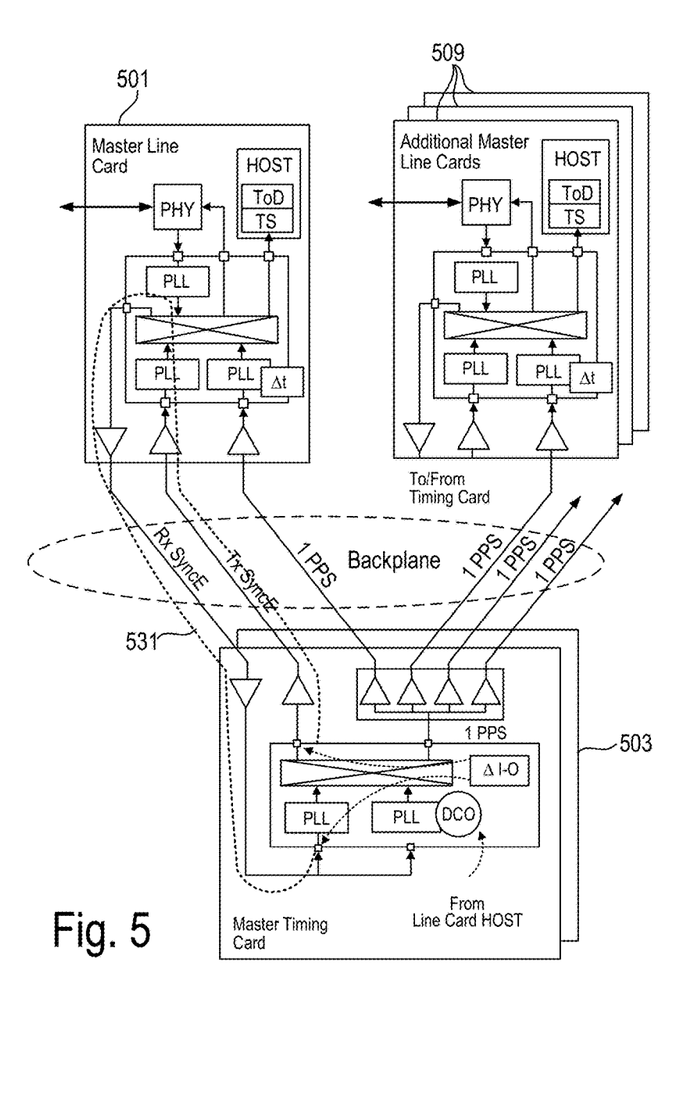
FIG. 5 illustrates an embodiment in which delay between the master timing card and a master line card is determine using a Synchronous Ethernet path.

FIGS. 4 and 5 illustrate that the identical approach can be used for all of the master line cards on the backplane, not just the slave line card. FIG. 4 shows the 1 PPS signal line being used for the transmit path and the Rx SyncE path being used for the return path to measure trace delays between master line card 401 and the timing card 403 using path 431. FIG. 5 shows the Tx SyncE signal line being used for the transmit path and the Rx SyncE being used for the return path for path 531 to measure the trace delays between master line card 501 and the timing card 503. The trace delays between the additional line cards 409 and 509 shown in FIGS. 4 and 5 and the timing card are measured in the same manner.

Figure 6:
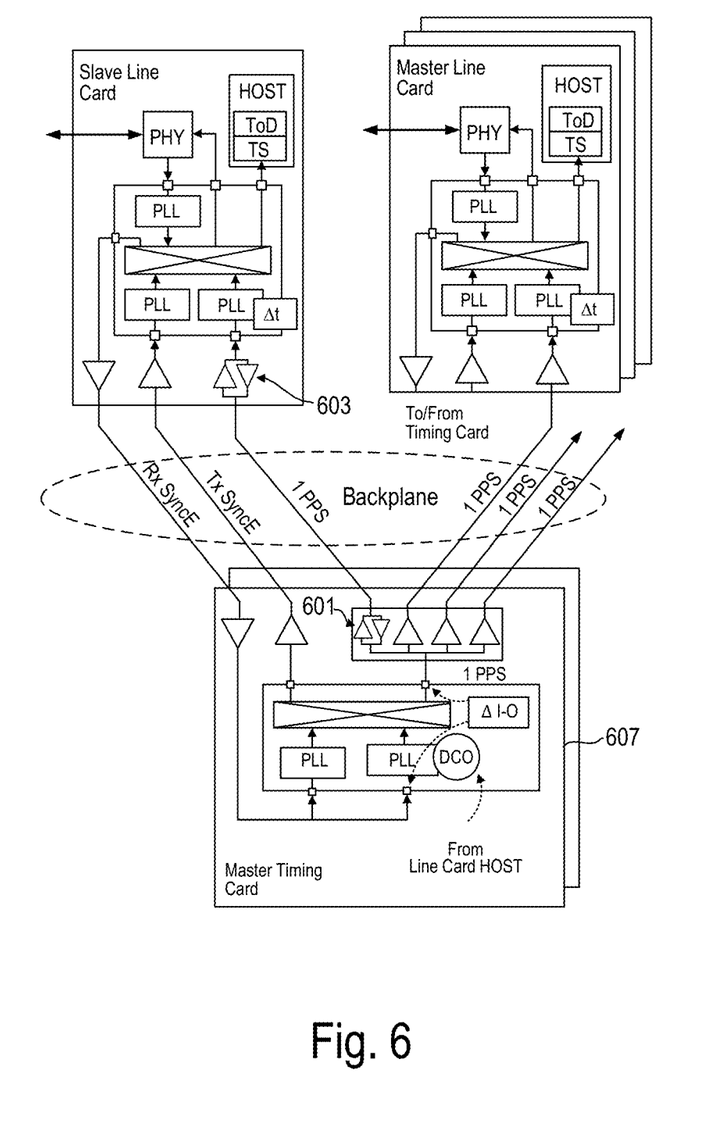
FIG. 6 illustrates limiting asymmetry by utilizing bidirectional buffers so the return path is identical to the transmit path.

One assumption made for embodiments illustrated in FIGS. 2, 3, 4 and 5 is that the forward and return paths are symmetric. Lack of symmetry in the forward and return paths can lead to errors in the trace delay compensation made by the line cards based on roundtrip measurements. Referring to FIG. 6, one way to limit asymmetry is to utilize bidirectional buffers 601 and 603 for the 1 PPS signal line (or the Tx SyncE signal line) so the return path is identical to the transmit path. In a test mode, the test pulse received at the slave line card 605 is returned through the bidirectional buffer 603 to the timing card 607.

Thus, roundtrip delay through existing backplane communication paths can be measured for each line card at startup and other suitable times and appropriate compensation made based on the roundtrip measurements. That improves on the alignment of ToD and 1pps using a manual and an open-loop process.

Figure 7:
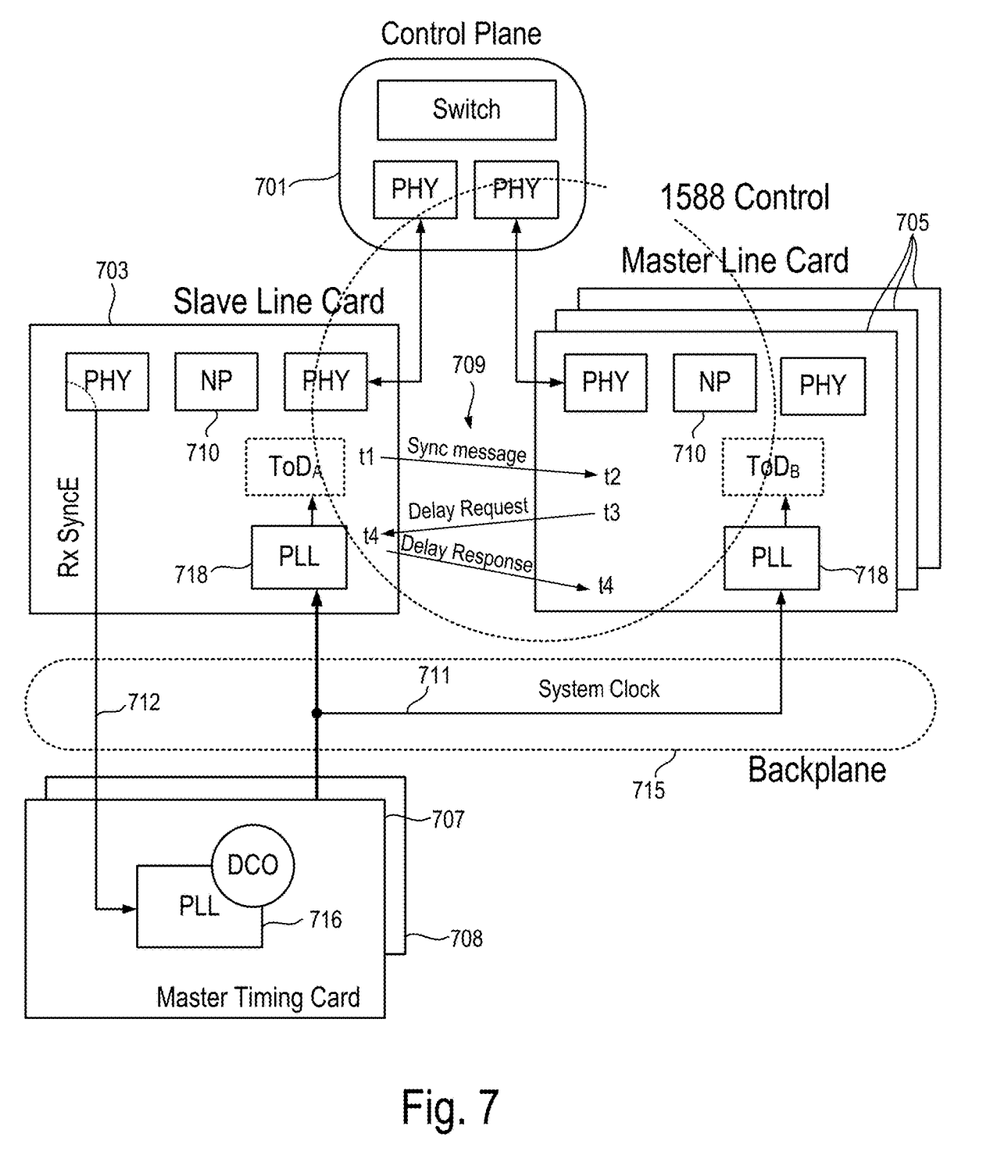
FIG. 7 illustrates an embodiment in which a control plane is used to exchange time stamps.

FIG. 7 illustrates another embodiment to achieve greater accuracy for ToD distribution to master line cards. In an embodiment system 700 functions as a Telecom Boundary Clock (TBC) at the edge of a larger system but the teachings of the embodiment of FIG. 7 can be used in multiple environments The embodiment of FIG. 7 includes a control plane, used to exchange time stamps. Physically, the control plane can be a backplane communications path and the line cards are physically coupled to the control plane through cabling or other electrical/optical connections with the backplane. As illustrated in FIG. 7, the control plane can further include circuits, e.g., field program gate arrays (FPGAs) and processors to perform necessary functions such as switching and transparent clocking as described further herein. The intelligence required by the control plane may be disposed directly on the backplane or disposed in a printed circuit board plugged or cabled into the backplane. The control plane can utilize, e.g., various high-speed communication protocols according to the requirements of the system. In embodiments the control plane is an ethernet based network. In other embodiments, rather than a backplane, the various components in the system may be integrated circuits coupled to a motherboard and the control plane may provide communications between the various components over the motherboard.

The system 700 further includes a slave line card 703, master line cards 705, and master timing card 707 and a backup timing card 708. If the slave line card 703 goes down, then the system switches to using one of the master line cards 705 as the slave card. That is possible because there are control plane inputs and outputs to every line card. Thus, there is infrastructure available for sharing time stamps between all line cards and the timing card 707. All though not shown in FIG. 7, in embodiments the timing card is also coupled to the control plane. The use of the control plane, which is available to all of the line cards in the system, allows use of the control plane to use time stamps to align all of the ToD counters in the master line cards. In an embodiment, the slave line card 703 synchronizes its ToD counter ($ToD_A$) with the grandmaster (GM). That can occur in a manner similar to that described for the system illustrated in FIG. 1. The 1 PPS signal is normally used to synchronize the 1 second rollover of the ToD counter. However, through the control plane, the system can synchronize time of day counters by exchanging time stamps such as shown at 709.

Assume the slave line card 703 becomes synchronized with the grand master (not shown in FIG. 7) and in turn the master timing card 707 becomes synchronized with the timing of the slave line card by using a clock signal on Rx SyncE 712. The network processor 710 (also referred to herein as a host processor) in the slave line card (or another control processor) controls the 1588 time stamp exchange with the grandmaster. The phase-locked loop (PLL) 716 generates the system clock signal 711 synchronized to the timing of the slave line card.

The timing card distributes a system clock 711 through the backplane 715 (or motherboard) to all of the line cards, including slave line card 703 and the master line cards 705. The line cards are frequency locked to the system clock 711 through their PLLs 718. Each of the master line cards 705 include a ToD counter that needs synchronization. For example, one of the master line cards 705 includes a ToD counter $ToD_B$. The slave line card 703 initiates a time stamp exchange 709 over the control plane with the one of the master line cards 705 to synchronize the $TOD_A$ counter and $ToD_B$ counter but with the advantage that master and slave are working with the same frequency using existing backplane frequency distribution of the system clock 711. Based on the time stamp exchange, the one way delay $$\left( \frac{(t2-t1)+(t4-t3)}{2} \right)$$

and error offset $$\left( \frac{(t2-t1)-(t4-t3)}{2} \right)$$

(see 107 in FIG. 1) are used to synchronize the ToD counters $ToD_A$ and $ToD_B$. Thus, the signal used to update the $ToD_B$ counter is based on the time stamp exchange and utilizes the system clock 711 that is synchronized to the slave line card. The 1 PPS signal is not necessary. The ToD counters throughout the system are synchronized in the same way. Note that once a master line card is aligned through a time stamp exchange, that master line card can be used to align other line cards. That is, there is no need for the slave line card to perform all the time stamp exchanges. Thus, in an embodiment one of the master line cards 705 synchronizes the ToD counter in another one of the master line cards using a time stamp exchange. In embodiments, systems may choose to have all the time stamp exchanges initiated by a single entity such as the slave line card, but that is not necessary.

There is low packet delay variations in the system because the time stamp exchange is localized. Although no longer necessary to align the ToD counters, the 1 PPS signal indicating rollover of the ToD counters can also be adjusted through this approach (time stamp exchange) if there is a desire to distribute the 1 PPS signal. Thus, the alignment of distributed 1 PPS signals can be improved using the time stamp exchange. Any kind of static asymmetry can be calibrated out. In addition, the control plane should be 1588 aware. That is the physical layer (PHYs) used in the control plane to exchange the time stamps should not add their own delay to the time stamp messages and instead use transparent clocking to pass the time stamp without adding delay by accounting for latency through the circuits of the PHY either by adjusting the time stamp to account for the latency or sending an additional message that indicates the latency.

In addition to the need for 1588 awareness, to achieve desired accuracy for the ToD, the time stamp should be high resolution. For example, a time stamp with nanosecond resolution or higher would be considered high resolution in this context. Such resolution is available in high performance timing integrated circuits. Network processors (NPs), FPGAs, and PHYs on the line cards and the timing card may be used to provide high resolution time stamping. An advantage of the embodiment in FIG. 7 is that existing infrastructure of the control plane can be exploited to achieve higher ToD accuracy.

1 PPS signals generated by various boards in a distributed system need to be synchronized so that they occur at nearly the same instant throughout the system. To achieve that degree of synchronization, and referring again to FIG. 1 in conventional systems, the timing card 109 sends simultaneous 1 PPS signals to every line card. Since these 1 PPS signals are transmitted simultaneously, separate communications paths are required from the timing card to the line cards for each of these 1 PPS signals, as shown for 1 PPS signal 117a, 117b, and 117c in FIG. 1. That has two problems: (1) multiple dedicated communications paths and (2) the lengths of these paths to and from the master timing card 110 are not identical, adding uncompensated delay, and causing misalignments. As the number of line cards increases, so does the number of traces in the backplane. The control and coordination of these systems is performed over yet another shared communications channel (see the control plane 701 in FIG. 7), adding more uncertainty. To address such issues, embodiments herein utilize a shared bus that time interleaves 1 PPS signals in such a manner that the delays introduced by interleaving the data in time can be precisely removed. Furthermore, the same shared bus can be utilized to also send control and coordination data, avoiding the use of another system. The shared bus provides one trace in the backplane that connects to all of the line cards as opposed to separate traces to all of the line cards.

Figure 8:
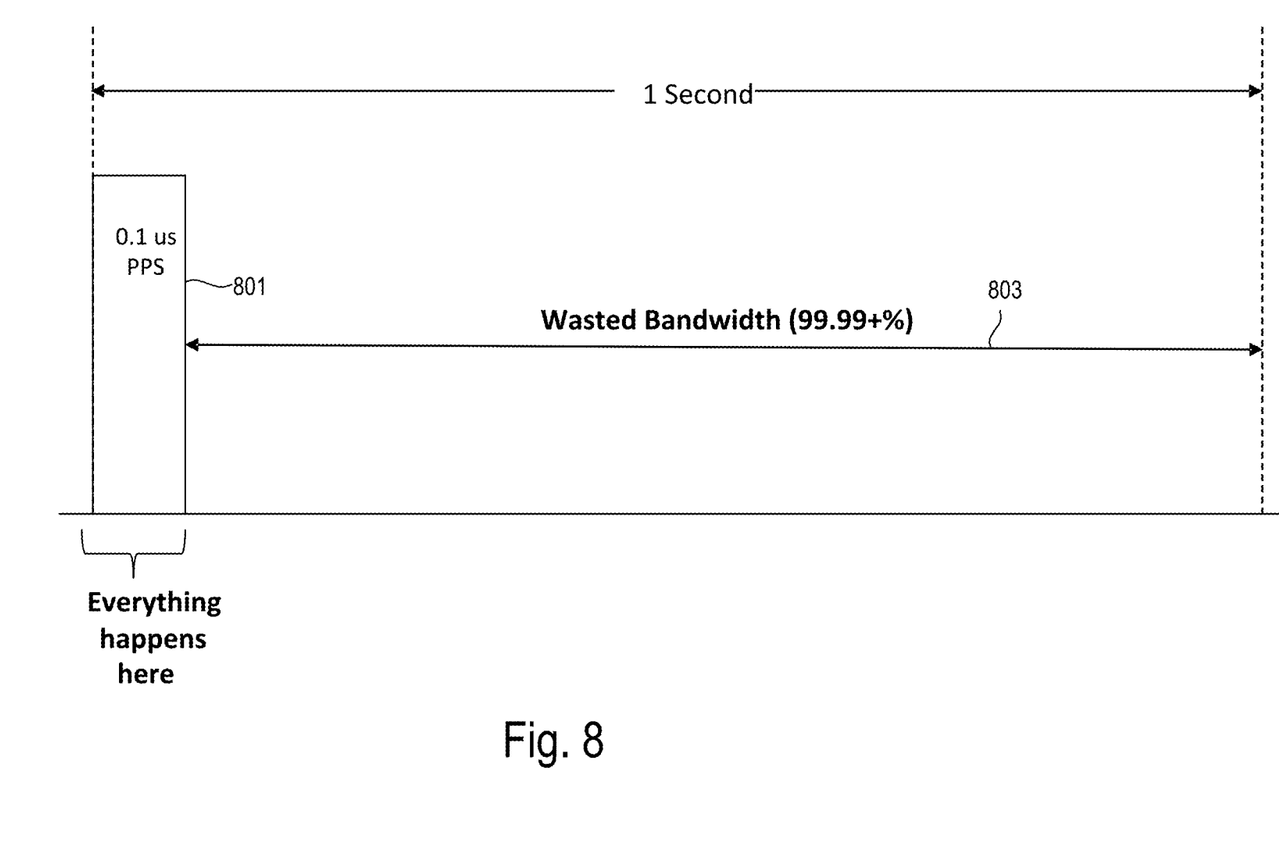
FIG. 8 illustrates wasted bandwidth in a conventional utilization of the 1 PPS signal line.

FIG. 8 illustrates utilization of the 1 PPS signal line in conventional systems. Over the 1 second interval, the 1 PPS signal line contains a 0.1 μs pulse 801. The remainder of the time (greater than 99.99%) indicated at 803, the signal line remains unused. In addition, the timing card sending the 1 PPS signals and the master line cards receiving the 1 PPS signals are configured in a star configuration with the timing card in the center and the master line cards connected by separate 1 PPS signal lines to the timing card.

Figure 9:
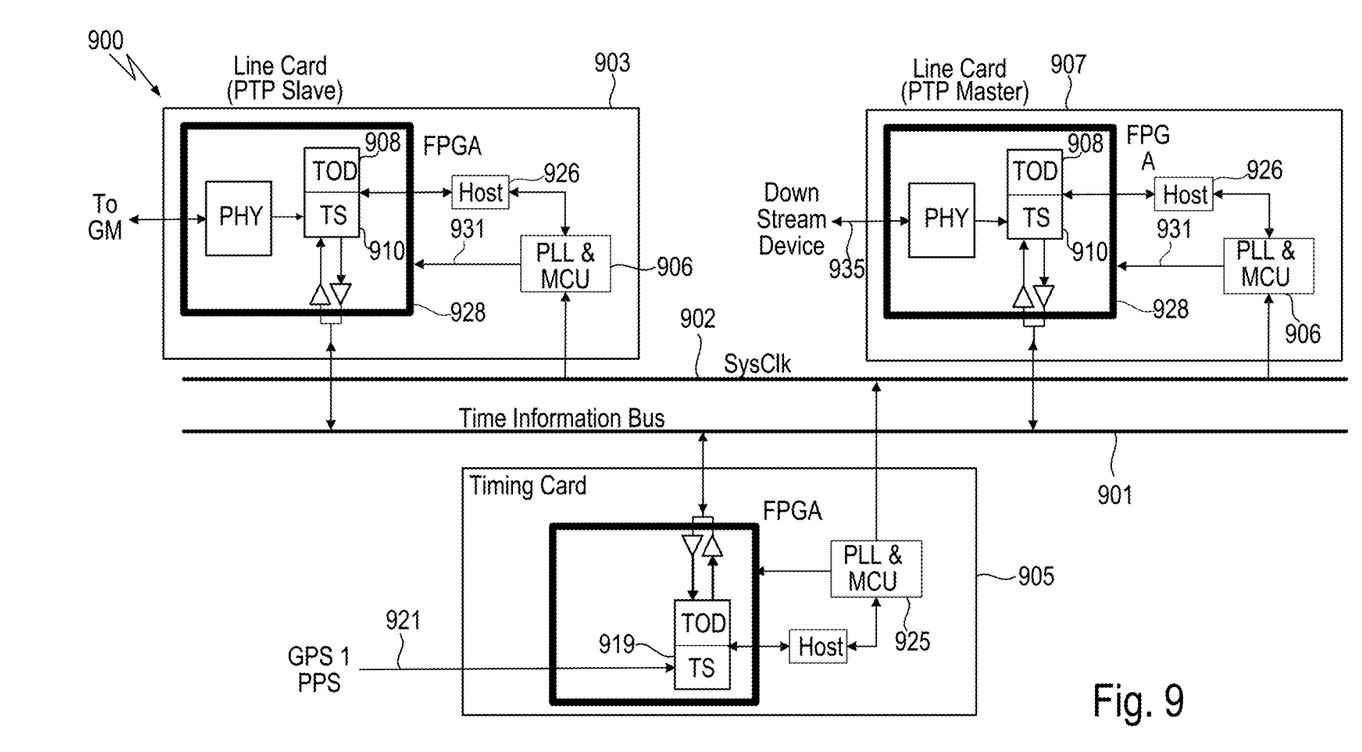
FIG. 9 illustrates an embodiment in which a time information supplies the 1 PPS signals to the line cards and also carries information between the primary timing source and the line cards.

Referring to FIG. 9, embodiments address the shortcomings of dedicating a 1 PPS connection to each master line card in a star configuration by using time information bus 901 in which the 1 second between rising edges of the 1 PPS signal on the PPS signal line are divided into multiple time slots. For example, the time information bus may be divided into frames that have 64 time slots for a time information bus that supports a system with 32 line cards. Of course, other embodiments may use a different number of time slots and support a different number of line cards. In the embodiment of FIG. 9, the timing card 905 generates and distributes the system clock (SysClk) 902 to all the line cards. Each of the line cards receives the system clock at phase-locked loop (PLL) 906 and maintains phase and frequency lock to the system clock. The microcontroller unit (MCU) also shown in 906 provides control functionality for the PLL including adjusting the phase and/or frequency of the local clock signal 931 generated by the PLL 906 based on time stamp exchanges. The host processor 926 implements the messaging and protocol stack associated with the 1588 and communicates with the time stamp logic in logic block 928. The local clock 931, based on the system clock 902, clocks the ToD counter 908 in each line card. The system clock is synchronous with the 1 PPS signal. In embodiments, a second timing card (not shown) provides redundancy. With a 125 MHz system clock and 64 time slots, each time slot is 1,953,125 cycles of the system clock, or approximately 15.6 ms. Rather than being distributed in a star configuration, the time information bus 901 is a passive bi-directional bus (a trace in the backplane going to each line card) and every card connected to the bus can transmit to or receive from the bus. That approach minimizes the number of traces in the backplane, which makes extending the bus to more line cards straightforward compared to the star configuration. In addition, the physical path is the same for both the receive and transmit directions, thus providing symmetry, which can be useful for accounting for path length differences.

Figure 10:
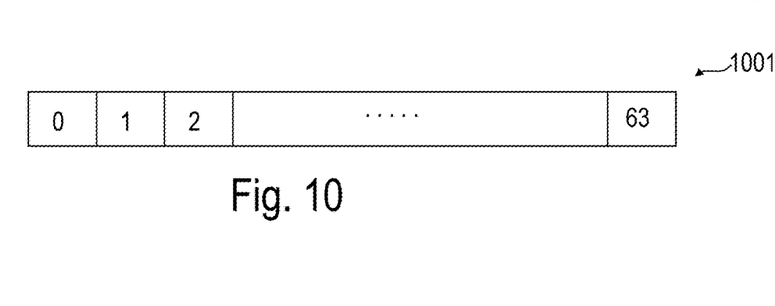
FIG. 10 illustrates a 1 second time information bus frame divided into multiple time slots.

FIG. 10 illustrates a 1 second time information bus frame 1001 divided into multiple time slots. FIG. 10 shows 64 time slots numbered (0, 1, 2, . . . , 63). Some of the time slots are allocated for transmission by the primary timing source to the line cards, and other time slots are allocated for transmission to the primary timing source from the line cards. In an embodiment, the primary timing source utilizes even time slots to send out the 1 PPS timing signals. The primary timing source provides the primary timing reference for the system and could be one of the line cards, e.g., the slave line card 903, or the timing card 905. The odd time slots are used by the line cards to send back a pulse, e.g., in a test mode, to the primary timing source and/or to send back other control and/or timestamp (TS) information. Using the even time slots for transmissions to the line cards and odd time slots for transmission from the line cards eliminates contention on the time information bus. In other embodiments the role of the odd and even time slots are swapped. If the slave line card is the primary timing source, the timing card communicates on the time information bus the same as one of the line cards. Time slot 0 or 1 may be encoded with identifying information in a predetermined location in the time slot for other cards to identify the time slot to keep the time information bus aligned. Alternatively, one or more other time slot(s) may include time slot identifying information in a predetermined location. Line cards utilize the bus based on an identification unique to the line card, e.g., their line card number on the bus (0, 1, 2 3, . . . ). Thus, e.g., line cards receive 1 PPS signals on the slot number equal to (line card number×2) and transmit on the time information bus on the time slot number equal to ((line card number× 2)+1). In that way line cards receive 1 PPS signals on even time slots and transmit information on odd time slots. Other embodiments use different approaches to assigning time slots to line cards based on the line card number.

When the system starts, the timing card 905 functions as the primary timing source. At some point in time, one of the line cards becomes a Precision Time Protocol (PTP) slave and in embodiments the PTP slave line card 903 assumes the primary timing source role. In the embodiment of FIG. 9, the PTP slave is communicatively coupled to the Grandmaster (GM) through the physical layer (PHY). That change in primary timing source role is coordinated via communications on the time information bus or via the control plane (see FIG. 7). FIG. 9 also shows a communication channel 935 from the line card 907 to a downstream external device that can be, e.g., an optical fiber connection.

Figure 11:
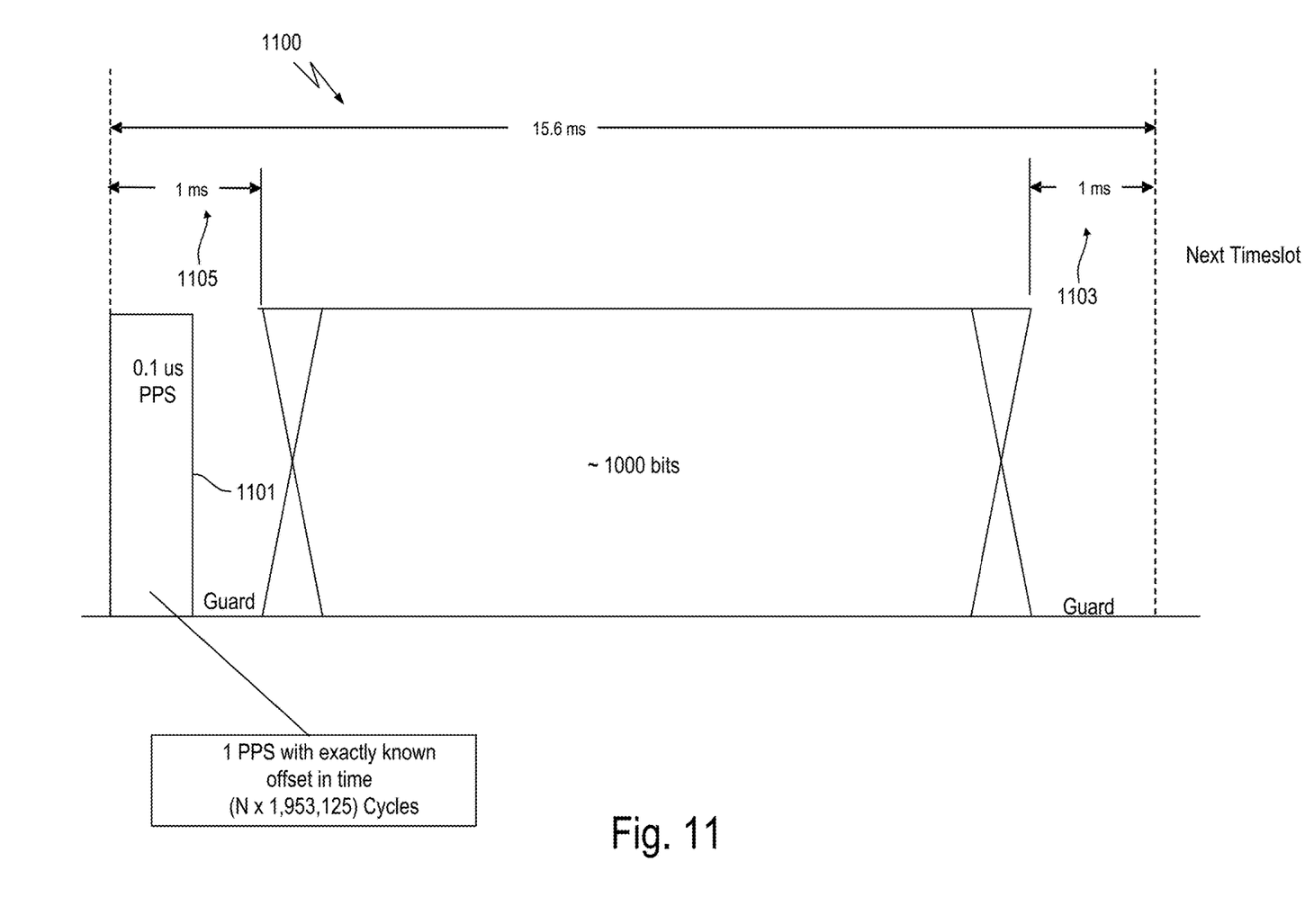
FIG. 11 illustrates an exemplary time slot in a frame of the time information bus.

FIG. 11 illustrates an exemplary time slot 1100. At the beginning of the time slot, the primary timing source sends the 0.1 μs 1 PPS signal as pulse 1101. Guard bands 1103 and 1105 extend for 1 ms from the beginning and end of the time slot leaving approximately 1000 bits for transmission of other information during the time slot to the line card from the primary timing source. Each of the line cards 907 is assigned to one of the 64 slots for receiving the 1 PPS signal. Thus, for an embodiment with 32 line cards, a 1 PPS signal is sent out 32 times during each second, one for each line card. The timing of the 1 PPS signal is known because it is known to occur at a particular offset of the system clock from the beginning of the frame. Assuming the 1 PPS signal occurs at the beginning of a time slot, for a 125 MHz system clock, the offset is (N×1,953,125) system clock cycles from the beginning of the frame, where N is the time slot number in the frame. For other locations for the 1 PPS signal in the time slot, the offset is increased based on the specific location in the time slot.

The timeslots can also serve as dedicated data channels for transmitting timestamp (TS) data t1, t2, t3, and t4. The time stamp logic is shown at 910 in the line cards 903 and 907 and 919 in the timing card 905. Due to the time slots, certain time stamp information is already known. For example, assume the 1 PPS signal from the primary timing source (or any other signal at a known location in the time slot) serves as the first time stamp. The time stamp itself is known a priori by the primary timing source based on the time slot number for the timing pulse. The t2 time stamp indicates the time the 1 PPS signal is received by the line card and can have, e.g., a range of ±1 μs to encompass worst case backplane travel. An 11 bit time stamp in time stamp logic 910 provides for 1 nanosecond accuracy, while a 15 bit time stamp gives 100 picosecond resolution. The t3 timestamp represents the local time the message is sent to the primary timing source and is known a priori by the time slot number (since each line card is assigned a unique time slot number) and assuming the time stamp is sent at a known location in the time slot. The t4 time stamp represents the time the t3 message is received by the primary timing source. Again, a range of ±1 μs should encompass worst case backplane travel. An 11 bit time stamp provides for 1 nanosecond accuracy, while a 15 bit time stamp provides 100 picosecond resolution. The length of the time stamp depends on the accuracy requirements of the particular implementation. The one way delay $$\left(\frac{(t2-t1)+(t4-t3)}{2}\right)$$

and error offset $$\left(\frac{(t2-t1)-(t4-t3)}{2}\right)$$

(see 107 in FIG. 1) can be used to determine the appropriate compensation to be used to account for delays between the primary timing source and the line card.

Trace delays between the primary timing source and the line cards can also be determined in a test mode by the primary timing source sending a pulse, which the line card returns over the time information bus. The symmetry on the bus makes the calculation of the delay a divide by two that can be used to accurately compensate for the delay in the backplane between the primary timing source and each of the line cards.

While the embodiment of the time slots shown in FIG. 11 places one 1 PPS signal in a time slot, in other embodiments, all the 1 PPS signals occur in the first ms of the frame. Thus, each master line card receives the 1 PPS signal in a predefined time of the first ms of the frame. The rest of the 1 second frame can be used for transmitting data/control in assigned time slots based on the unique line card identification, e.g., (0, 1, 2 3, ... ). Other embodiments group the 1 PPS signals at other predetermined times in the frame allowing the remainder of the frame to be used for data/control information. In still other embodiments, the 1 PPS signal shown at in FIG. 11 is supplied to all of the line cards at the same time. That is, at a predetermined time in the frame, e.g., the beginning of the first time slot, the line cards listen to a broadcast of the 1 PPS signal and the remainder of the frame is available for messaging between the line cards and the primary timing source. The remainder of the frame can be divided up into time slots for transmissions to and from respective line cards according to their line card ID.

In an embodiment, time slot 0 belongs to the primary timing source and when functioning as the primary timing source, the timing card assumes the time slot of the primary timing source. However, the assignment of the primary timing source does not have to be static and whichever card is the primary timing source can assume the first time slot.

Present implementations have a separate system for incorporating 1 PPS information into distributed systems from satellite timing signals such as GPS (United States), Galileo (Europe), BeiDou (China) and other types of Global Navigation Satellite System (GNSS) technology. By timestamping the received satellite 1 PPS signal, a single approach can be used to interface an IEEE 1588 system 900 to other networked IEEE 1588 systems and GNSS signals.

The source of the "system" for 1 PPS/ToD will move to where the primary timing signal is coming into the system. The primary timing signal may come into the system from the line card that has the primary Precision Time Protocol (PTP) role (i.e. the PTP slave). In embodiments, when the system is in GPS (or other satellite system) operation or initial bring-up or free-run, the timing card provides the source of the system timing. The timing card has a GPS unit, which can be used as a backup in case the PTP slave goes down. Moving the source of the system to where the primary timing signal is coming into the system helps reduce the degradation of the timing information as it is being processed by more cards.

Embodiments in GPS operation use a timestamper, which simplifies the operation of the system considerably. Use of the timestamper keeps the PTP timestamp concept used for the PTP slave, but switches to using timestamps based on the GPS 1 PSS signal. The operation is similar to the PTP one-way time sync configuration. That is, with a GPS signal, there is no communications back to the GPS system. Once the GPS information is time-stamped the system treats the GPS information as a primary timing source. Thus, referring back to FIG. 9, time stamp logic 919 in timing card 905 receives a satellite 1 PPS signal 921. The PLL 925 in the timing card 905 becomes synchronized with the 1 PPS signal and the 1 PPS signal sent over the time information bus 901 is synchronized with the satellite 1 PPS signal. That makes the ToD of the system 900 synchronized to the satellite 1 PPS signal.

Switching between PTP and GPS can be smoother (since the same control loop is used) if time stamps are used to align all of the line cards in the system over a dedicated time information bus since any concerns about buffer delays of a shared communications resource are eliminated. Similar to PTP, timestamp data is exchanged between the primary timestamper, e.g., the timing card 905, and the distributed timestampers, e.g., the line cards 907. The data is exchanged via the time information bus 901. Note that the time stamper in the line cards and the timing card may reside in field programmable gate arrays (FPGAs) 928 or other types of integrated circuits and in embodiments the timestamper has the ability to time stamp internal signals or external signals received by the integrated circuit as needed to implement the 1588 time stamp exchange.

When the primary timing source is moved, e.g., from the slave line card coupled to the grand master to the timing card coupled to receive a GPS signal, the current primary timing source, the slave line card goes into holdover. In holdover, the phase and frequency of the 1 PPS signal is held to its current phase and frequency. In addition, the timing card enters holdover of the system clock (SysClk), which is distributed over the backplane to the line cards and synchronized to 1 PPS/ToD used in the system. Thus, the system clock is held at its current phase and frequency. The new primary timing source (the timing card 905) does the equivalent to phase jamming of its 1 PPS, that is adjusting the phase of 1 PPS signal to match the new primary timing source. Remember the system was locked, so the system clock is very close in frequency to what it should be, as is the 1 PPS signal. In an embodiment, the communication regarding the change in primary timing source occurs over the time information bus. Thus, the current or future timing source sends a message over the time information bus requesting the change, which is acknowledged by the message recipient. Additional messages as needed to make the change are exchanged over the time information bus. Thus, e.g., the new primary timing source (the timing card 905) communicates to the PTP Slave line card 903 that starting, e.g., at the next frame, the new primary timing source (the timing card 905) will be supplying the 1 PPS signal. Once nominally locked, the timing card 905 exits holdover. New time stamps are exchanged with all the line cards since the path lengths between the new primary timing source and the line cards differs from the path lengths between the previous primary timing source and the line cards. Note that path asymmetries (to and from) the line cards are nil since the time information bus is being used for communication in both directions. The time stamper measures, at the pin, the outgoing pulse as well as the incoming pulses. The only sensitivity is to the variability in the path between the pin of the integrated circuit to the time stamper internal to the integrated circuit.

Figure 12:
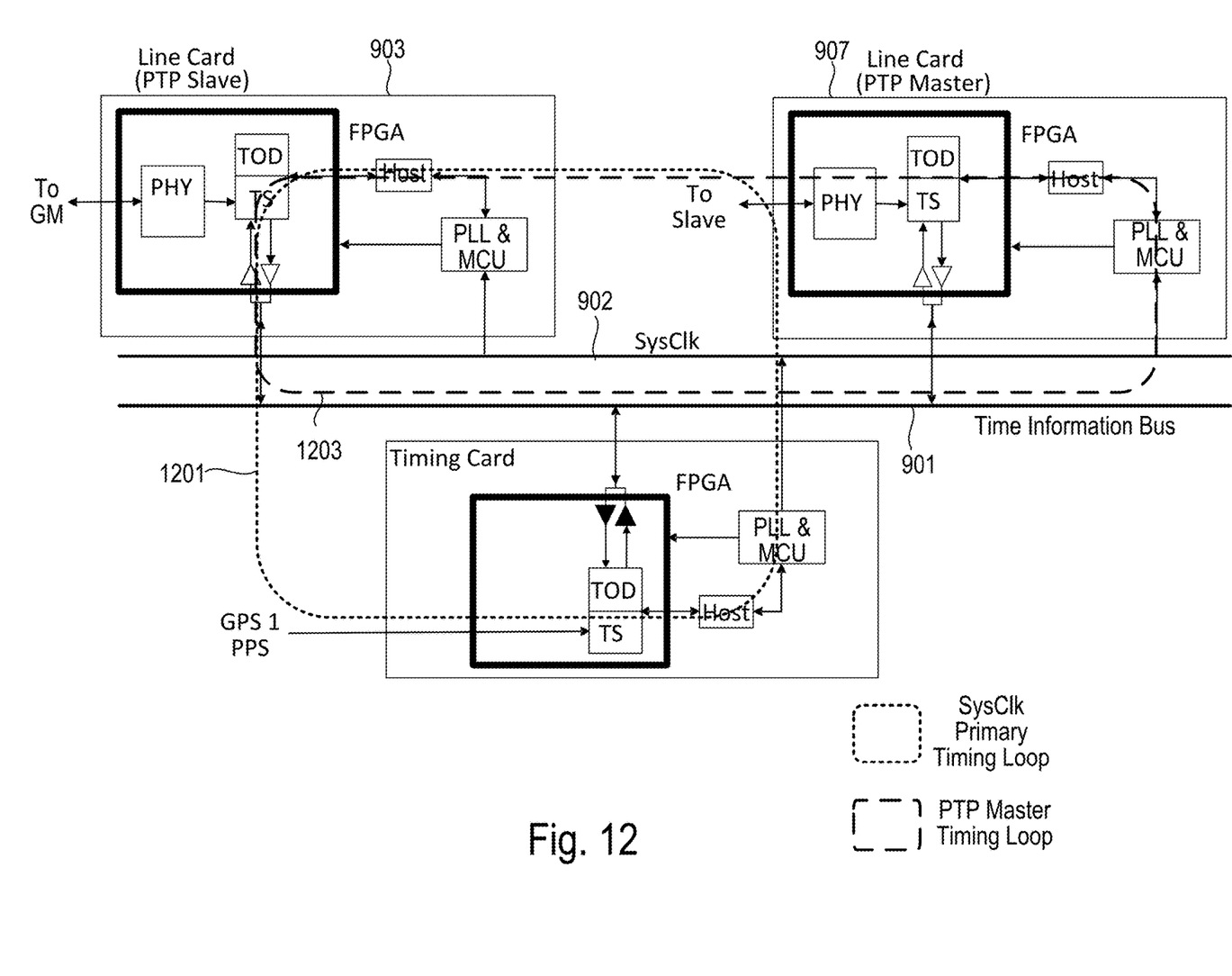
FIG. 12 illustrates the primary system clock timing loop and the PTP master timing loop.

FIG. 12 illustrates the system clock (SysClk) primary loop 1201 and the PTP master timing loop 1203. The SysClk primary timing loop 1201 locks the system clock (SysClk) 902 to the timing of the PTP slave and thus the grandmaster (GM) assuming the PTP Slave is acting as the primary timing source. The PTP Master Timing Loop 1203 allows the PTP Masters to have their timing adjusted based on time stamp exchanges over the time information bus. Thus, assuming the PTP Slave 903 is supplying the 1 PPS signals over the time information bus, the 1 PPS signals can be adjusted based on, e.g., time stamp exchange over the time information bus 901.

Thus, the time information bus may be utilized to provide both the 1 PPS signal and provide bidirectional communication between the primary timing source and the other cards (e.g., line cards or timing card) in the system. The time information bus may be used to exchange time stamps between the primary timing source and the other cards in the system. The time information bus may also be used when the primary timing source changes from, e.g., the timing card based on a satellite 1 PPS signal to the PTP slave line card coupled to the GrandMaster or vice versa.

The terms "first," "second," "third," and so forth, as used in the claims, unless otherwise clear by context, is to distinguish between different items in the claims and does not otherwise indicate or imply any order in time or location. For instance, "a first time slot," "a second time slot," does not indicate or imply that the first time slot occurs in time before the second slot or in a particular location in a frame.

Thus, various aspects have been described related to using a backplane and time stamp exchanges to update time of day counters. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method for synchronizing time of day counters comprising:
    synchronizing a first time of day counter on a slave line card to grandmaster timing;
    synchronizing a second time of day counter on a first master line card to the first time of day counter on the slave line card based on a first time stamp exchange between the slave line card and the first master line card;
    performing a second time stamp exchange between the first master line card and a second master line card; and
    synchronizing a third time of day counter in the second master line card to the second time of day counter in the first master line card based on the second time stamp exchange between the first master line card and the second master line card while the first master line card maintains synchronization with the slave line card.

2. The method as recited in claim 1 wherein time stamps exchanged in the first time stamp exchange have a resolution of at least one nanosecond.

3. The method as recited in claim 1 wherein the first and second time stamp exchanges occur over a control plane.

4. The method as recited in claim 1 further comprising synchronizing a master time card with a clock signal received from the slave line card.

5. The method as recited in claim 4 further comprising generating a system clock based on a phase lock loop synchronized to timing of the slave line card.

6. The method as recited in claim 1 wherein the first master line card and second master line card have local clock signals that are frequency locked to a master timing card.

7. The method as recited in claim 6 further comprising measuring a roundtrip time for a signal sent between the master timing card and the slave line card.

8. The method as recited in claim 6 further comprising determining an error offset based on the first time stamp exchange.

9. The method as recited in claim 6 further comprising updating the second time of day counter based on at least the first time stamp exchange and a system clock received from the master timing card.

10. The method as recited in claim 1 further comprising improving alignment of a one pulse per second signal that indicates rollover of the first time of day counters with the first time stamp exchange.

11. An apparatus that synchronizes time of day counters comprising:
    a slave line card with a first time of day counter synchronized to grandmaster timing;
    a first master line card with a second time of day counter synchronized with the first time of day counter on the slave line card based on a first time stamp exchange between the slave line card and the first master line card; and
    a second master line card configured to perform a second time stamp exchange with the first master line card, the second master line card including a third time of day counter synchronized with the second time of day counter in the first master line card based on the second time stamp exchange between the first master line card and the second master line card while the first master line card maintains synchronization with the slave line card.

12. The apparatus as recited in claim 11 wherein time stamps exchanged in the first time stamp exchange have a resolution of at least one nanosecond.

13. The apparatus as recited in claim 11 wherein the first and second time stamp exchanges occur over a control plane.

14. The apparatus as recited in claim 11 further a master time card that is synchronized with a clock signal received from the slave line card.

15. The apparatus as recited in claim 14 further comprising a system clock that is based on a phase lock loop synchronized with timing of the slave line card.

16. The apparatus as recited in claim 11 wherein the first master line card and second master line card have local clock signals that are frequency locked to a master timing card.

17. The apparatus as recited in claim 16 wherein the master timing card measures a roundtrip time for a signal sent between the master timing card and the slave line card.

18. The apparatus as recited in claim 17 wherein the master timing card determines an error offset based on the first time stamp exchange.

19. The apparatus as recited in claim 16 wherein the second time of day counter is updated based on at least the first time stamp exchange and a system clock received from the master timing card.

20. The apparatus as recited in claim 11 further comprising a one pulse per second signal that indicates rollover of the first time of day counter, the one pulse per signal alignment is improved with the first time stamp exchange.

* * * * *